Patented Oct. 21, 1952

2,614,905

UNITED STATES PATENT OFFICE 2,614,905

METHOD OF COAGULATING POLYVANADIC ACID SALTS

Tom S. Perrin, Painesville, Ohio, assignor to Diamond Alkali Company, Cleveland, Ohio, a corporation of Delaware No Drawing. Application November 1, 1949, Serial No. 124,954

6 Claims. (Cl. 23—51)

This invention relates to a method of coagulating polyvanadic acid salts and more particularly relates to a method for polymerizing metavanadic acid and coagulating polyvanadic acid salts derived therefrom.

Vanadium is customarily extracted from ores containing vanadium compounds associated with other heavy metal compounds by roasting the ore with alkalies, such as soda ash, and leaching the ore roast with water to obtain a solution of alkali metal salts of hydrous oxidic vanadium acids, such as $HVO_3$, $H_2V_4O_9$, and salts of heavy metal oxide acids, from which solution the heavy metal salts are removed by fractional crystallization or by the use of chemical precipitating agents.

In a co-pending application, Ser. No. 59,935, filed November 13, 1948, in the name of the present inventor and another, now Patent No. 2,583,591 dated January 29, 1952, there is described a process for the separation of salts of hexametavanadic acid from solutions of soluble chromate salts, in which process the chromium and vanadium containing ore is roasted with an alkali, such as sodium carbonate, after which the ore roast is leached with water and the vanadium removed from the leach liquor by precipitation of lead vanadate along with some lead chromate, using lead sulfate as the precipitant. The lead vanadate-lead chromate precipitate is then decomposed with sulfuric acid to regenerate lead sulfate as an insoluble precipitate and to form vanadic acids ($HVO_3$, and possibly some $H_2V_4O_9$) and chromic acid in the acid extract solution. The present invention is particularly applicable to the recovery of vanadium values from this latter solution or from vanadium containing process solutions of a similar chemical nature.

It has heretofore been proposed to precipitate "hydrous vanadium oxide" from acid solutions by adjusting the pH of the solution to a point within the range of 2–3, and heating the acid solution to a temperature above 90° C. and up to the boiling point of the solution, in order to prevent precipitation of the hydrous vanadium oxide as a gummy hydrogel. It has also been proposed to precipitate a polyvanadic acid salt, such as the salt $Na_2H_2V_6O_{17}$, or the analogous ammonium salt from acidified solutions of alkali metal vanadates at temperatures of the order of 60° to 90° C., and to employ an oxidizing agent to effect "hydrolysis" of vanadic acid ($HVO_3$) to the particular polyvanadic acid salt desired.

It has now been found that in order to approach quantitative recovery of vanadium values, the hydrous acid vanadium oxides contained in the above-described acid extracts and solutions of vanadates must be completely oxidized to the highest state of oxidation for vanadium. In the prior art methods, the necessity for such oxidation has not been appreciated nor has it been achieved and thus, the precipitation of the particular polyvanadic acid salts by prior art methods does not approach quantitative recovery of available vanadic acids from such solutions. In this connection, it has also been found that not all oxidizing agents are equally effective in bringing about the oxidation of the vanadium to its highest valence state and the polymerization of the metavanadic acid.

The present invention contemplates the improvement in vanadium recovery processes which includes the use of lead peroxide ($PbO_2$) as the oxidizing agent whereby complete oxidation and ultimate high yield recovery of vanadium are achieved. For example, lead peroxide, and the reduction products thereof from the oxidation of the lower hydrous acidic vanadium oxide, do not react with the other acids in the acid extracts or acidified vanadate solutions to form soluble lead compounds at the acid concentrations generally employed, and in the contact time interval allowed for the reaction of the lead peroxide with the lower valent hydrous acidic vanadium oxides. Moreover, lead peroxide, while effecting the desired oxidation of the lower acidic vanadium oxide compounds, does not introduce foreign ions into the acid extract solution from which the polyvanadic acid compounds are precipitated and therefore does not affect the subsequent recovery of other heavy metal salts or acids from the solutions. This latter advantage is of importance in the recovery of chromic acids or chromates from the mother liquor obtained from the decomposition of the mixture of lead vanadate and lead chromate precipitates described hereinabove in connection with the co-pending application Ser. No. 59,935 (Patent No. 2,583,591). Thus, an oxidizing agent such as a hypochlorite, disclosed in said co-pending application to be effective as an oxidizing agent in this connection, introduces the chloride ion into the solution, which chloride ion, upon extended contact with the solutions of hexavalent chromium salts, reduces these salts to the trivalent state whereby appreciable amounts of trivalent chromium compounds are carried over into subsequent chemical processes, such as chrome pigment manufacture, wherein the chloride ion or the trivalent chromium compounds have a deleterious effect.

In addition to its function as an oxidizing agent, lead peroxide apparently acts as a polymerization promoter of outstanding efficiency for the metavanadic acid, whereby recovery of approximately 97% of the available vanadium in the form of hexametavanadic acid or salts thereof, such as $Na_2H_2V_6O_{17}$ (which is a salt of hexameric $HVO_3$ minus one molecule of water), is possible. Furthermore, lead peroxide and its reduction products are readily separated from the acid solution containing the hydrous acidic vanadium oxides to be coagulated. Where such separation is made prior to the coagulation of the polyvanadic acid salt, contamination of the coagulum or the mother liquor by the lead peroxide or its reduction product is avoided, and a clean separation of the polyvanadic acid coagulum from the mother liquor and lead peroxide and its reduction products is effected.

The combined effect of lead peroxide in promoting polymerization of vanadic acid and in oxidizing lower acidic vanadium oxides is in marked contrast to the action of other oxidizing agents, for example, hydrogen peroxide or sodium chlorate. These latter agents would be expected to exhibit the same chemical behavior in the acid solutions of hydrous acidic vanadium oxides that lead peroxide does, and, moreover, to the same degree. Hydrogen peroxide and sodium chlorate, however, do not act as effectively in converting soluble hydrous acidic vanadium oxides to the insoluble polyvanadic acid salts referred to above, as evidenced by the fact that the maximum recovery of the polyvanadic acid salts obtainable by the use of these reagents is generally less than 50% of the available vanadium contained in the acid solution, while when lead peroxide is used as the oxidizing agent and polymerization promoter, substantially quantitative precipitation of the available vanadium as polyvanadic acid salts results.

More specifically, in the method of coagulating polyvanadic acid salts of hexametavanadic acid in which initially a solution containing a mixture of hydrous acidic vanadium oxides is neutralized to a pH within the range of 1–3, and subsequently a coagulum of salts of said polyvanadic acid is obtained therefrom, the present invention is directed to the improvement which includes the steps of contacting a body of said solution prior to neutralization with a mass of lead peroxide, to oxidize reduced vanadium oxide compounds in said mixture to metavanadic acid, and separating said solution from said mass and the reduction products thereof.

The vanadium-containing solution from which it is desired to recover the vanadium values may be derived from any suitable source of hydrous acidic vanadium oxides, such as the acid extract of a precipitate of insoluble vanadates, or an acidified solution of soluble alkali metal vanadates, or the like. It is preferable in practicing the method of the present invention to concentrate, dilute, or add vanadium compounds to the solution from which the hexametavanadic acid salt is to be precipitated, in order that the concentration of vanadium compounds therein be substantially within the range of 16–20 grams per liter, calculated as $HVO_3$, at the time the lead peroxide is brought into contact with the solution. It is also preferable to maintain a pH of less than one in the acid extract or acidified solution of vanadates at the time the lead peroxide is brought into contact therewith because of the greater solubility of the hydrous acidic vanadium oxides at such acid concentration and because at higher pH's, such as within the range of 1–3, precipitation of polyvanadic acids and their salts from the solution is initiated. Such precipitation would necessarily cause an undesirable intermixing of the mass of lead peroxide, its reduction product, and the polyvanadic acids, whereby an additional separation of these substances would be required in order to recover the vanadium values.

The amount of lead peroxide to be employed in the practice of the method of the present invention may suitably be of the order of 0.4–1.2 times the weight of vanadium, calculated as $HVO_3$, in the acid vanadium-containing solution. It is preferred, however, to use an amount of lead peroxide within the range of 0.6–0.8 the weight of vanadium, calculated as $HVO_3$.

The identity of the reduction product of the lead peroxide is not definitely established. The reduction product appears after contact with the acid vanadium-containing solution as a black or dark gray mass, insoluble at the preferred pH employed in the method of the present invention, which properties are indicative at least of the compound of $Pb_2O$, although some doubt exists of the existence of such a compound. It is equally apparent, however, that the reduction product is not the lead compound identified in the art as $PbO$ since this compound is soluble in, or reacts readily with, chromic acid; the reduction product obtained in the method of the present invention does not react with or dissolve in a mother liquor which includes chromic acid.

The mass of lead peroxide and its reduction product, after being brought into contact with the hydrous acidic vanadium oxide-containing solution, and allowed to remain therein for a period of time sufficient to effect the oxidation of the lower valent vanadium compounds of such solution, is readily separated from the solution by simple filtration. The lead peroxide may be regenerated from the reduction product by methods well known in the art, such as by air oxidation, or by oxidation with certain alkali metal salts, or by electrolytic oxidation.

After the separation of the mass of lead peroxide and its reduction product from the body of solution containing the vanadium compounds, a base such as caustic soda, or an alkaline sodium salt or alkaline ammonium salt, is added to the solution to adjust the pH to a point within the range of 1–2.5, preferably to a pH of the order of 2. Coagulation of the polymeric sodium or ammonium hexametavanadic acid salt begins almost immediately. The solution is heated, preferably to a temperature within the range of approximately 60° C. to the boiling point of the solution during the coagulation of the disodium or diammonium salt of hexametavanadic acid, which may require from one-half hour to three hours to effect substantially complete coagulation of the salt. The heated solution may also be agitated during the coagulation step since it has been found that heating and agitation effect a more rapid agglomeration of the coagulum than is obtainable by either heating the solution without agitation or agitating the solution without heating. The separation of the disodium or diammonium hexametavanadate from the mother liquor is readily effected by simple filtration, the disodium or diammonium salt being in a readily filterable crystalline form as opposed to the gummy hydrogel which is obtained by certain of the prior art methods, referred to hereinabove.

The vanadium content of the hexametavanadate salt may be recovered by methods familiar to those skilled in the art. One such method includes converting to the ammonium salt by known means and heating such salt to a temperature above 300° C., whereby ammonia is released from the compound and a substantially pure metallurgical grade of vanadium oxide ($V_2O_5$) is obtained as a residue.

In order that those skilled in the art may better understand the method of the present invention and in what manner the same may be carried into effect, the following specific examples are offered, in which the recovery of disodium hexametavanadic acid is used for illustration:

Example 1

A mass of a co-precipitate of lead vanadate and lead chromate, obtained from a process for the separation of chromium and vanadium values in chromate liquors by precipitation therefrom of the vanadium values as lead vanadate, together with a small amount of lead chromate, is treated with sulfuric acid (45%) in an amount equivalent to 1.2 times the amount of lead in the precipitate to convert the chromate and vanadate radicals of the precipitate to chromic and vanadic acids and form lead sulfate. The resulting solution having a pH of less than one is diluted with an equal volume of water, separated from the insoluble lead sulfate by filtration and concentrated to give a solution having 19.2 grams of vanadium per liter of solution, calculated as $HVO_3$. The solution is separated into five portions, each of which is contacted with an amount of lead peroxide ($PbO_2$) indicated in the table below, and stirred at a temperature near the boiling point of the solution for a period of about five minutes. Thereafter, the mass of reduced and unreduced lead peroxide is settled for a few minutes and separated from the supernatant liquor by filtration. The pH of the hot solution is adjusted to 2 by slowly adding 50% sodium hydroxide to the solution while continuing the agitation. Thereafter, the agitation is continued while heating the solution to a temperature within the range of 90° to 95° C. for a period of three hours. The following results are obtained:

| Weight Ratio, $PbO_2/HVO_3$ | Percent $HVO_3$ Removed |
| --- | --- |
| 1.17 | 96.2 |
| 0.8 | 97.5 |
| 0.6 | 79.0 |
| 0.52 | 84.0 |
| 0.43 | 80.0 |

Example 2

A solution containing 19.2 grams per liter of vanadium, calculated as $HVO_3$, is contacted with an amount of lead peroxide equal to 0.68 the weight of the $HVO_3$ contained in the solution, heated to a temperature near the boiling point of the solution for a period of about five minutes, after which the reduced lead peroxide is separated from the body of solution by filtration. Thereafter, the solution is divided into three portions and pH adjusted to points within the range of 1 to 2, as indicated in the table below. The solutions are agitated for a period of approximately three hours at a temperature within the range of 90° to 95° C. The following results are obtained:

| pH | ml. 50% NaOH/100 ml. Solution | Percent $HVO_3$ Removed |
| --- | --- | --- |
| 1.0 | 6.0 | 81.3 |
| 1.5 | 8.5 | 94.2 |
| 2.0 | 10.0 | 97.5 |

Example 3

The concentration of the vanadic acid, calculated as $HVO_3$, and the weight ratio of lead peroxide to vanadic acid ($HVO_3$) are the same as described in Example 2; the pH of the solution during the coagulation of the disodium hexametavanadic acid is maintained at 2 and during the coagulation, the solution is agitated and maintained at a temperature of the order of 90° to 95° C. The time of agitation is the variable in this experiment. The following results are obtained:

| Time of Agitation—Hours | Percent $HVO_3$ Removed |
| --- | --- |
| 0.5 | 36.2 |
| 1.0 | 67.0 |
| 2.0 | 74.6 |
| 2.5 | 95.5 |
| 3.0 | 97.5 |

Employing the techniques of Examples 1–3, other hexametavanadic salts, such as the diammonium salt, may be recovered.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the method of coagulating sodium and ammonium acid salts of hexametavanadic acid, in which a solution containing a mixture of hydrous acidic vanadium oxides and having a pH of less than 1 is neutralized with a base of the class of sodium and ammonium bases to a pH within the range of 1–3 to precipitate a coagulum of salts of hexametavanadic acid, the improvement which comprises the steps of contacting a body of said solution prior to neutralization with a mass of lead peroxide to oxidize reduced hydrous acidic vanadium oxides in said mixture and polymerize the metavanadic acid to hexametavanadic acid, and separating said solution from said mass and the reduction product thereof.

2. In the method of claim 1, the improvement which includes providing a mass of lead peroxide amounting to 0.4 to 1.2 times the weight of vanadium, calculated as $HVO_3$, in said mixture.

3. In the method of claim 1, the improvement which includes the step of adjusting the concentration of vanadium, calculated as $HVO_3$, in said solution to a point within the range of 16–20 grams per liter of solution, prior to adding lead peroxide to said solution.

4. In the method of claim 1, the improvement which includes providing a mass of lead peroxide in an amount from 0.4 to 1.2 times the weight of vanadium, calculated as $HVO_3$, in said mixture, separating said mass and the reduction product thereof from said solution, and thereafter heating and agitating said solution at a temperature within the range of 60° C. to the boiling point of said solution for a period of one to three hours.

5. In the method of coagulating sodium and ammonium acid salts of hexametavanadic acid, in which a solution containing a mixture of hydrous acidic vanadium oxides and having a pH less than one is neutralized with a base of the class of sodium and ammonium bases to a pH within the range of 1-3 to precipitate a coagulum of a salt of the class of disodium and diammonium salts of hexametavanadic acid, the improvement which comprises the steps of contacting a body of said solution with a mass of lead peroxide to oxidize reduced hydrous acidic vanadium oxides in said mixtures, polymerizing the oxidized hydrous acidic vanadium oxides to hexametavanadic acid in the presence of said lead peroxide and its reduction product, and separating said mass and its reduction product from said solution, all prior to neutralizing said solution and coagulating a salt of said class.

6. The method of coagulating a salt selected from the group of sodium and ammonium acid salts of hexametavanadic acid which includes the steps of contacting a solution comprising reduced hydrous acidic vanadium oxides having a pH of less than 1 with lead peroxide to oxidize said oxides, polymerizing the oxidized vanadium oxides present in said solution to hexametavanadic acid in the presence of said lead peroxide and its reduction product, separating said lead peroxide and its reduction product from said solution, neutralizing said solution with a base of the class of sodium and ammonium bases to a pH within the range of 1-3 to precipitate a coagulum of a salt selected from the group of disodium and diammonium salts of hexametavanadic acid.

TOM S. PERRIN.

REFERENCES CITED

The following references are of record in the file of this patent:

UNITED STATES PATENTS

| Number | Name | Date |
| --- | --- | --- |
| 1,020,312 | Saklatwalla | Mar. 12, 1912 |
| 1,596,483 | Frick | Aug. 17, 1926 |
| 1,621,038 | Thews | Mar. 15, 1927 |
| 1,733,700 | Stevens et al. | Oct. 29, 1929 |
| 2,130,579 | Bowman | Sept. 20, 1938 |
| 2,479,905 | Cole et al. | Aug. 23, 1949 |